United States Patent
Kwon et al.

(10) Patent No.: US 12,036,920 B2
(45) Date of Patent: Jul. 16, 2024

(54) ROOM LAMP FOR VEHICLE ASSEMBLED WITHOUT USING ADHESIVE

(71) Applicant: DAEHAN SOLUTION CO., LTD, Incheon (KR)

(72) Inventors: Choong Ho Kwon, Seoul (KR); Jeon Yong-Seok, Incheon (KR)

(73) Assignee: DAEHAN SOLUTION CO., LTD., Incheon (KR)

(*) Notice: Subject to any disclaimer, the term of this patent is extended or adjusted under 35 U.S.C. 154(b) by 0 days.

(21) Appl. No.: 18/207,411

(22) Filed: Jun. 8, 2023

(65) Prior Publication Data
US 2023/0406201 A1    Dec. 21, 2023

(30) Foreign Application Priority Data
Jun. 21, 2022    (KR) .................. 10-2022-0075488

(51) Int. Cl.
*B60Q 3/51* (2017.01)
(52) U.S. Cl.
CPC ..................... *B60Q 3/51* (2017.02)
(58) Field of Classification Search
CPC ..................................... B60Q 3/51
USPC ...................................... 362/490
See application file for complete search history.

(56) References Cited

U.S. PATENT DOCUMENTS

| | | | | |
|---|---|---|---|---|
| 5,465,200 A | * | 11/1995 | Finocchio | B60Q 1/263 362/480 |
| 7,287,890 B2 | * | 10/2007 | Okabe | B60Q 3/51 362/490 |
| 8,322,900 B2 | * | 12/2012 | Suzuki | B60Q 3/51 362/147 |
| 2001/0022730 A1 | * | 9/2001 | Nagata | B60Q 3/51 362/147 |

FOREIGN PATENT DOCUMENTS

| KR | 100346438 B1 | 8/2002 |
|---|---|---|
| KR | 1020220067035 A | 5/2022 |

* cited by examiner

*Primary Examiner* — Laura K Tso
(74) *Attorney, Agent, or Firm* — BACON & THOMAS, PLLC

(57) ABSTRACT

A room lamp for a vehicle capable of being assembled without using an adhesive and provides a room lamp for a vehicle, which is fastened and assembled using a screw in a state in which an assembly hole formed in a room lamp plate is overlappingly placed on a through-hole formed in a head liner and a division protrusion formed in the room lamp is assembled to sequentially pass through the through-hole and the assembly hole, so that the room lamp can be easily and conveniently assembled or disassembled without using an adhesive and can be easily and conveniently assembled at a predetermined position as the division protrusion functions as a pin.

2 Claims, 7 Drawing Sheets

ROOM LAMP FOR VEHICLE ASSEMBLED WITHOUT USING ADHESIVE

CROSS-REFERENCE TO RELATED APPLICATION

This application claims priority to and the benefit of Korean Patent Application No. 10-2022-0075488 filed on Jun. 21, 2022, the disclosure of which is incorporated herein by reference in its entirety.

BACKGROUND OF THE INVENTION

1. Field of the Invention

The present disclosure relates to a room lamp for a vehicle, and more particularly, to a room lamp in which in a state in which a division protrusion formed in the room lamp sequentially passes through the room lamp plate and the head liner while a head liner and a room lamp plate overlap each other, the room lamp is fastened with a screw and firmly fixed, and thus the room lamp can be mounted without using an adhesive, is assembled by being fastened with a screw in a pre-assembled state, and thus can be easily, quickly, and accurately assembled at a predetermined position.

2. Discussion of Related Art

In general, as illustrated in FIGS. 1 and 2, a room lamp L is installed in a head liner H of a vehicle. In this case, the room lamp L is mounted on an opening formed in the head liner H on an interior of the vehicle, that is, installed on a room lamp bracket (plate) B installed to surround an edge perimeter of the opening O on a surface facing a loop panel to firmly mount the room lamp L. In this way, the room lamp plate is manufactured in various manners such as Patent Document 1 and Patent Document 2 as follows to firmly support the room lamp.

Patent Document 1: Korean Patent Application Publication No. 10-2022-0067035

An elastic member is formed integrally with an edge of a plate body used for mounting a room lamp to fixedly surround a wiring ring so that the wiring ring is prevented from hitting the plate body or the head liner during traveling by fixing the wiring ring to the plate body. Thus, even while noise and allophone is suppressed, the wiring ring is fixed in an appropriate length at which the wiring ring may be attached to the room lamp, and thus assembly work may be easily, conveniently, and precisely performed. In particular, since both ends of the elastic member are bent to face each other and two elastic pieces formed to face each other are configured to face each other, the wiring ring is allowed to be fixed therebetween and when the wiring ring is pressed on the parts bent to face each other, the assembly may be easily performed. Further, a reinforcement protrusion is formed between the elastic member and the plate body, so that the wiring ring can be more firmly supported and fixed.

Patent Document 2: Korean Patent No. 10-0346438

A room lamp having an improved room lamp bracket is provided in which a room lamp bracket extension is formed with a rib protruding from a middle in horizontal and vertical directions and is attached in close contact with a top ceiling without gaps, and thus there is no noise and allophone resulting from bumping under various vibrations when a door is opened or closed or when the room lamp bracket extension passes through an uneven part. The room lamp having an improved room lamp bracket includes a bulb that emits a light beam to an inside of a vehicle, a lens that protects the bulb, a room lamp body to which a lens is attached around a circumference thereof, and a room lamp bracket having bolt holes at corners to guide the room lamp body such that the room lamp body is attached to a roof panel. Further, a protruding bead may be formed at a middle part of the room lamp bracket in the horizontal and vertical directions and thus may be in close contact with the top ceiling when the room lamp bracket is attached.

RELATED ART DOCUMENT

Patent Document (Patent Document 1) Korean Patent Application Publication No. 10-2022-0067035 (published on May 24, 2022)

(Patent Document 2) Korean Patent No. 10-0346438 (registered on Jul. 15, 2002)

SUMMARY OF THE INVENTION

Meanwhile, a room lamp bracket (plate) according to the related art has the following problems because an adhesive is used when the room lamp bracket is mounted on a head liner.

(1) When an adhesive is applied to an edge of an opening and then the room lamp plate is attached, there is a risk of the room lamp plate deviating from a predetermined position while being assembled. This not only degrades the quality but also makes it impossible to assemble a room lamp when the room lamp is assembled or allows the room lamp to deviate from the predetermined position even when the room lamp is assembled, and thus the aesthetic aspect of an interior of a vehicle may be degraded.

(2) The adhesive is hardened over time and becomes damaged or broken, and a loop panel indirectly and greatly affects the adhesive. In this way, the hardened adhesive may be easily damaged or broken by receiving vibration or the like occurring when the vehicle travels, and accordingly, the room lamp plate may be detached or separated.

(3) When a situation occurs in which the room lamp plate needs to be separated in some cases, such as when work is performed after the head liner is separated or when the room lamp is repaired or replaced, it is difficult to separate the room lamp plate attached to the head liner without damaging the head liner.

(4) In this way, even the room lamp plate is separated and then is replaced with another room lamp plate and the another room lamp plate is attached, the above-described problem occurs.

The present disclosure is directed to providing a room lamp for a vehicle assembled without using an adhesive, which is fastened and assembled using a screw in a state in which an assembly hole formed in a room lamp plate is overlappingly placed on a through-hole formed in a head liner and a division protrusion formed in the room lamp is assembled to sequentially pass through the through-hole and the assembly hole, so that the room lamp can be easily and conveniently assembled or disassembled without using an adhesive and can be easily and conveniently assembled at a predetermined position as the division protrusion functions as a pin.

In particular, the present disclosure is directed to also providing a room lamp for a vehicle capable of being assembled without using an adhesive, in which at least one seat is provided in the room lamp plate to surround the room lamp, a buffer pad is forcibly fitted in and assembled with this seat, and thus a desired operation can be easily performed without removing or separating the buffer pad even while a buffer operation is performed between the head liner and the loop panel.

A room lamp for a vehicle capable of being assembled without using an adhesive is configured wherein a room lamp plate (200) is mounted on one surface and the room lamp (300) for a vehicle is assembled with the room lamp plate (200) on the other surface with respect to an opening (110) formed in a head liner (100), through-holes (111) are formed at least two positions protruding inward from edges of the opening (110), assembly holes (210) are formed at positions facing the through-holes (111) to pass through the room lamp plate (200), and division protrusions (310) installed to sequentially pass through the through-holes (111) and the assembly holes (210) overlapping each other are formed in the room lamp (300), and as the division protrusions (310) are fastened with screws (311) at the room lamp (300), ends of the division protrusions (310) are widened and thus stopped by edges of the through-holes (111).

A least one seat (220) may be formed in the room lamp plate (200) to surround the room lamp (300), and the seat (220) may be formed in a container shape so that a buffer pad (221) is forcibly fitted in and assembled with the seat (220).

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF THE INVENTION

Figure 1:
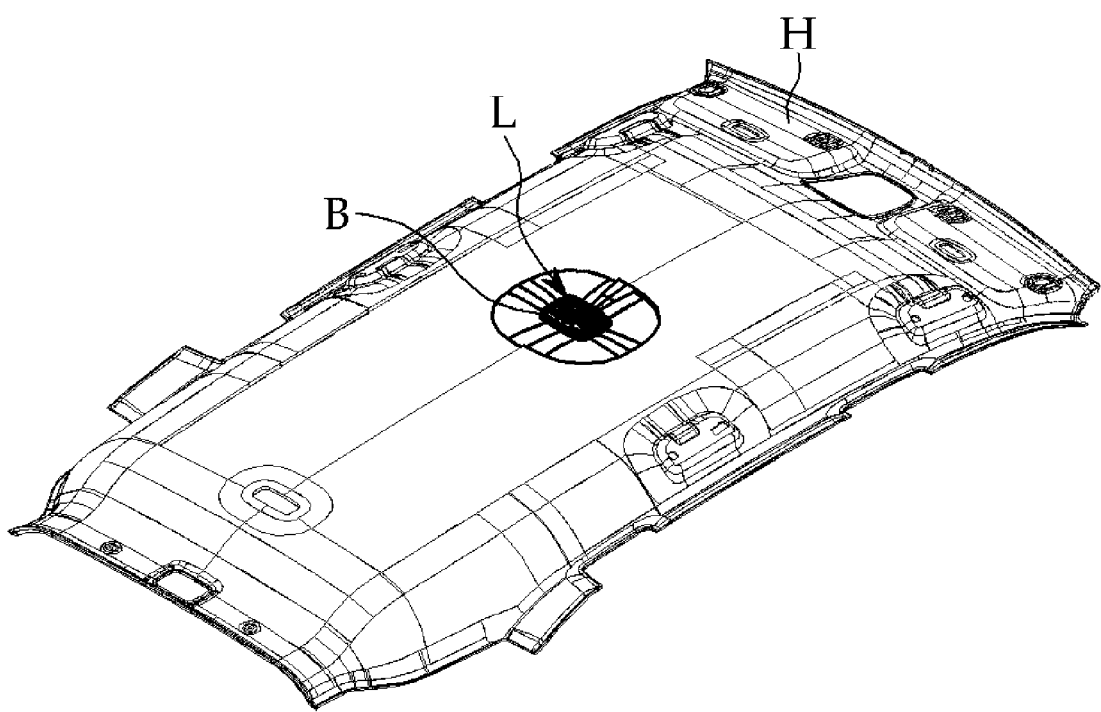
FIG. 1 is a perspective view of a head liner, illustrating a position of a room lamp mounted on an opening formed in the head liner.
Figure 2:
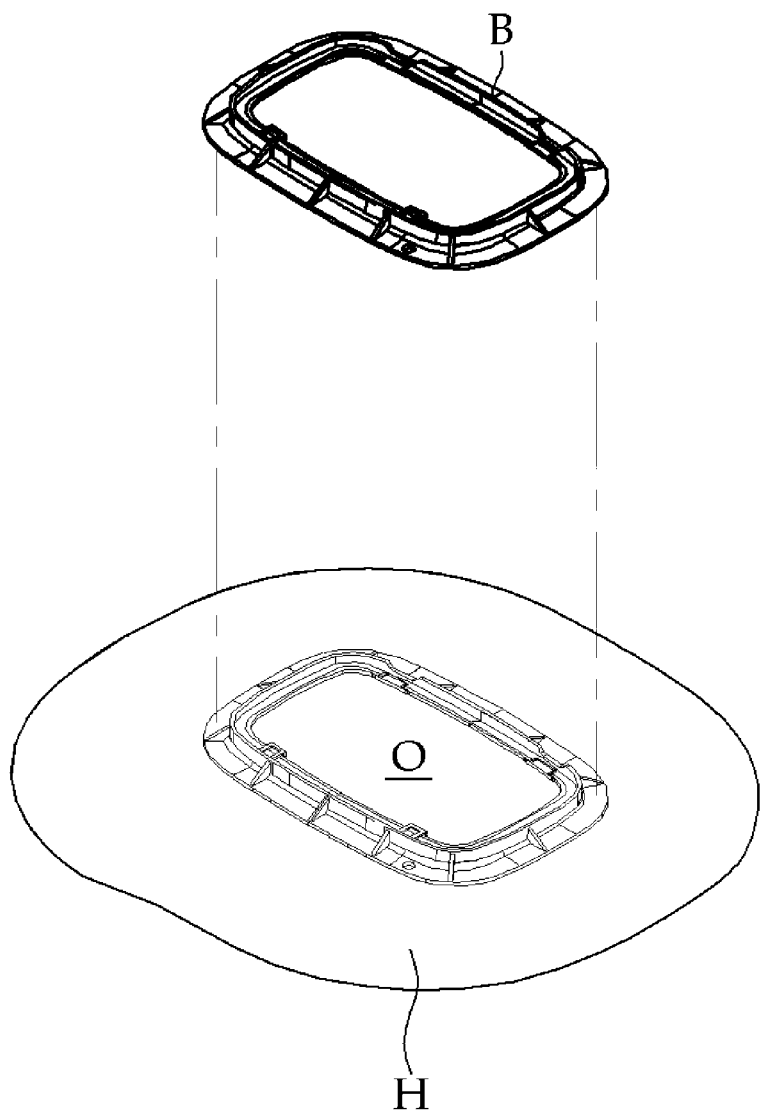
FIG. 2 is an enlarged view illustrating a position at which a room lamp plate is attached to the opening formed in the head liner.

Hereinafter, embodiments of the present disclosure will be described in more detail with reference to the accompanying drawings. Prior to this, terms or words used in the present specification should not be interpreted as being limited to usual or dictionary meanings and should be interpreted as meanings and concepts corresponding to the technical spirit of the present disclosure according to the principle that the inventor may properly define the concepts of the terms in order to describe his/her own invention in the best way.

Thus, since the embodiments described in the present specification and configurations illustrated in the drawings are merely the most exemplary embodiments of the present disclosure and do not represent all the technical spirit of the present disclosure, it should be understood that various equivalents and variations that may replace the embodiments and the configurations are present at filling of the present application.

Configuration of Room Lamp

As illustrated in FIGS. 3 to 7, a room lamp 300 for a vehicle capable of being assembled without using an adhesive according to the present disclosure is mounted on one surface of an opening 110 which is formed on a head liner 100 and on which a room lamp plate 200 is mounted on the other surface thereof.

In this case, in a state in which a through-hole 111 and an assembly hole 210 are formed at overlapping positions of the room lamp plate 200 and the head liner 100 and a division protrusion 310 formed in the room lamp 300 sequentially passes through the assembly hole 210 and the through-hole 111, the division protrusion 310 is fastened and assembled with a screw 311. Thus, the room lamp plate 200 can be assembled without using an adhesive, the division protrusion 310 serves as a guide pin, and thus the room lamp 300 can be easily, conveniently, and accurately assembled at a predetermined position.

Further, at least one seat 220 is provided in the room lamp plate 200 to surround the room lamp 300, a buffer pad 221 is forcibly inserted and assembled to the seat 220, and thus even while a buffer operation is performed so that the room lamp 300 does not collide with a loop panel, the buffer pad 221 is prevented from being easily separated from the room lamp plate 200.

Hereinafter, these configurations will be described in more detail with reference to the accompanying drawings.

A. Head Liner

Figure 3:
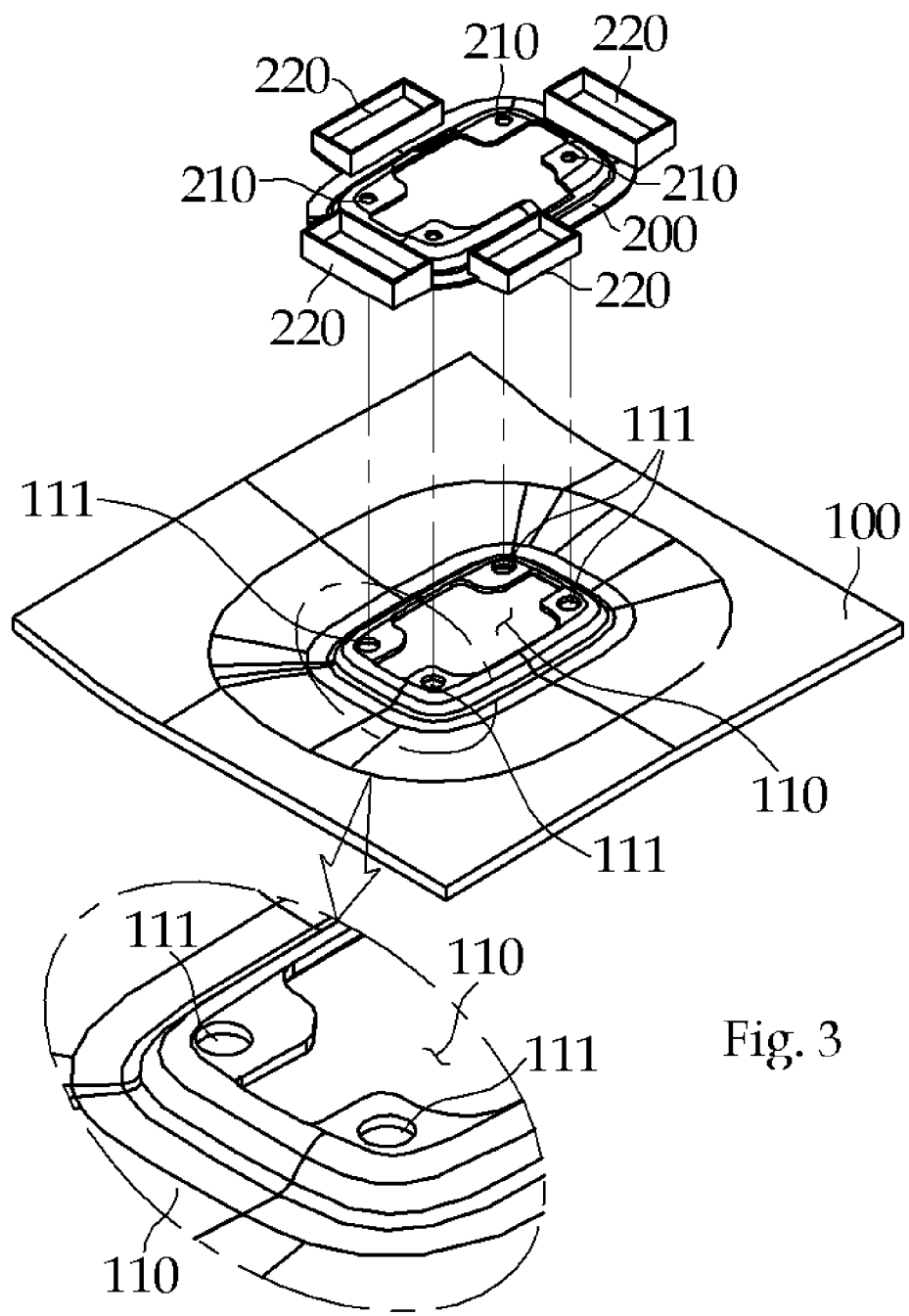
FIG. 3 is an exploded perspective view illustrating a state in which the room lamp plate is installed to overlap the head liner according to the present disclosure.
Figure 4:
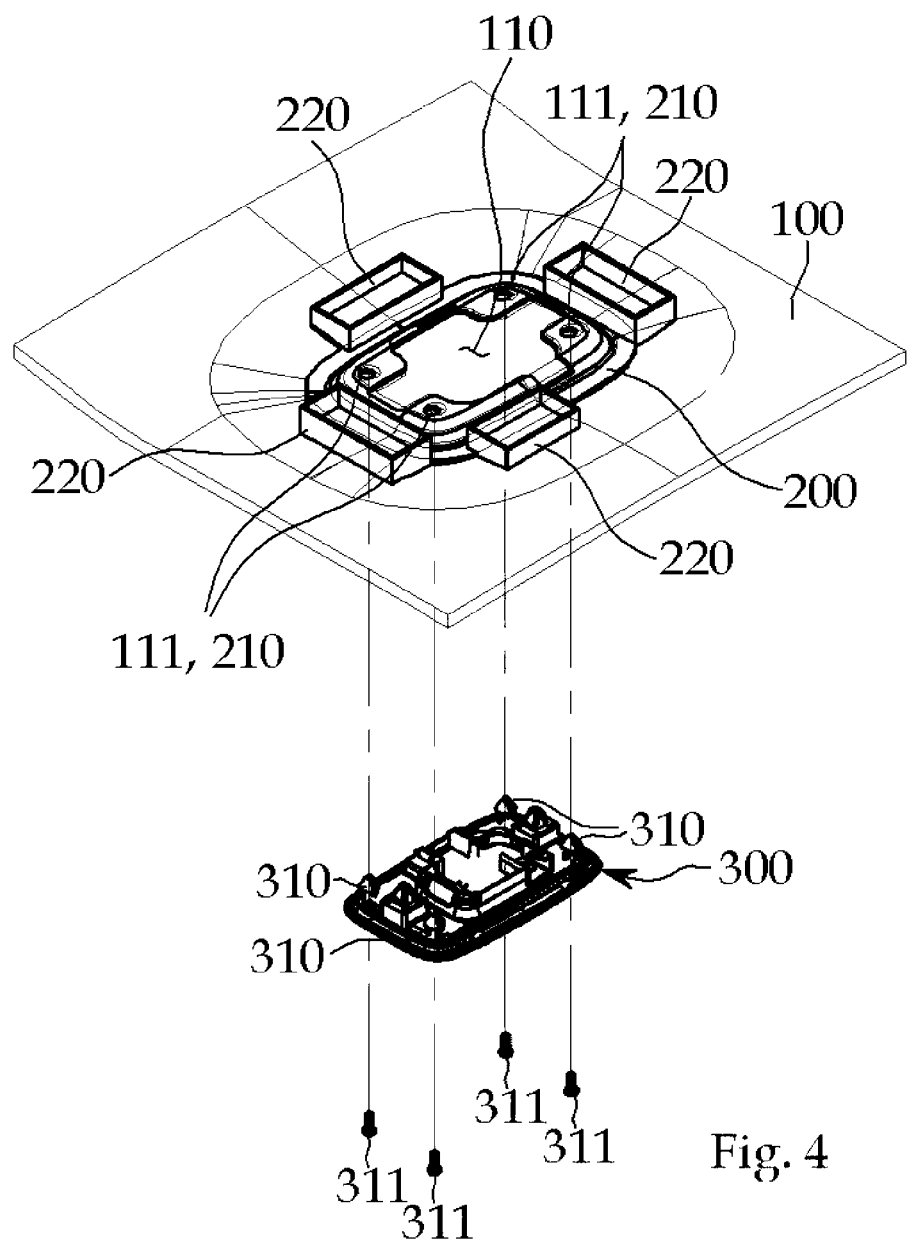
FIG. 4 is an exploded perspective view illustrating a state in which the room lamp is assembled to the head liner that the room lamp plate overlaps according to the present disclosure.

As illustrated in FIGS. 3 and 4, the opening 110 is formed to pass through the head liner 100 so that the room lamp 300, which will be described below, may be installed. Further, the room lamp plate 200, which will be described below, is mounted on a surface of the opening 110 facing the loop panel, and the room lamp 300 is mounted on an opposite surface thereto.

Meanwhile, as illustrated in FIGS. 3 and 4, a protrusion protrudes inward from an edge of the opening 110, and at least two through-holes 111 are formed in this protrusion. Here, when the opening 110 is formed in the head liner 100, a portion of the protrusion protrudes into the opening 110 to form the through-hole 111. In this case, one through-hole 111 may be formed at each protrusion or two through-holes 111 may be formed at one protrusion. In the drawing, it is illustrated that one through-hole 111 is formed at each of four protrusions.

In an embodiment of the present disclosure, the protrusion may be formed such that interference is not caused when the room lamp 300, which will be described below, is assembled and the assembly of the room lamp 300 is not hindered.

The room lamp plate 200 is mounted on the through-hole 111 formed in this way.

B. Room Lamp Plate

Figure 5:
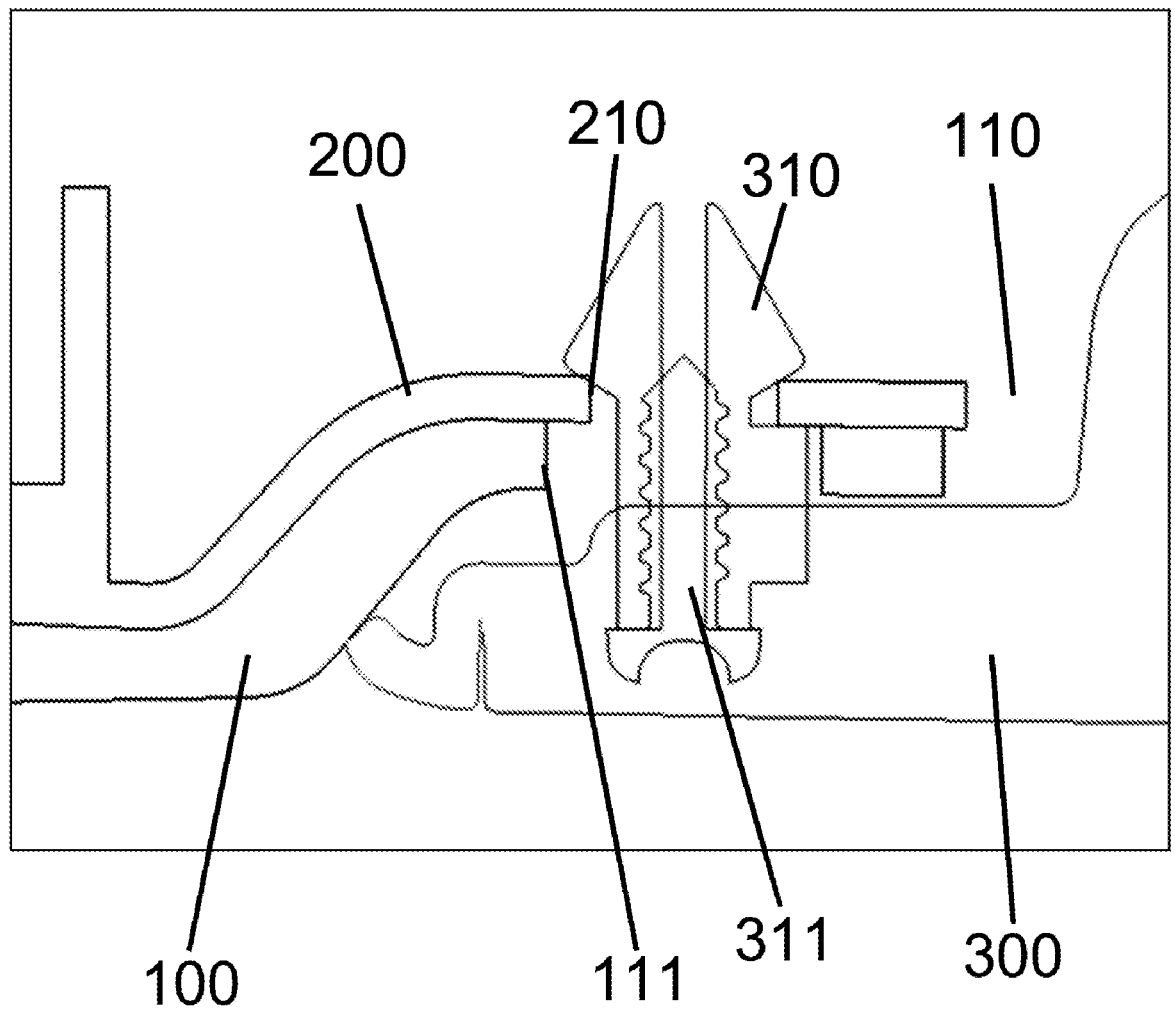
FIG. 5 is a cross-sectional view illustrating a state in which the room lamp is assembled and fixedly fastened using a screw according to the present disclosure.

As illustrated in FIGS. 3 to 5, the room lamp plate 200 is installed in close contact with an edge of the opening 110 to support and fix the room lamp 300, which will be described below.

In this case, the assembly hole 210 is formed in the room lamp plate 200 and is fastened and assembled to the room lamp 300 with the division protrusion 310 and the screw 311. Further, the seat 220 may be additionally formed to surround a periphery of the room lamp 300.

1. Assembly Hole

As illustrated in FIGS. 3 to 5, the assembly holes 210 are formed at positions facing the through-holes 111. Further, as the division protrusions 310 formed in the room lamp 300, which will be described below, are installed to pass through the assembly holes 210 while fitted in the through-holes 111, a state in which the room lamp plate 200 and the room lamp 300 are temporarily assembled through the division protrusions 310 on both sides of the head liner 100 is maintained.

2. Seat

As illustrated in FIGS. 3 and 4, at least one seat 220 is formed to surround the periphery of the room lamp 300. In this case, the buffer pad 221 is installed in the seat 200 and performs the buffer operation to protect the room lamp 300 even when the head liner 100 is pressed toward the loop panel.

In this case, the buffer pad 221 may be made of polypropylene (PP) and may be forcibly fitted in and mounted on the seat 200 so that the buffer pad 221 is not easily separated.

In the drawings, it is illustrated that one seat 220 is formed at each side of the room lamp 300 having a rectangular shape, but those skilled in the art to which the present disclosure pertains may easily understand that any form may be configured as long as the form may perform the buffer operation.

C. Room Lamp

Figure 6:
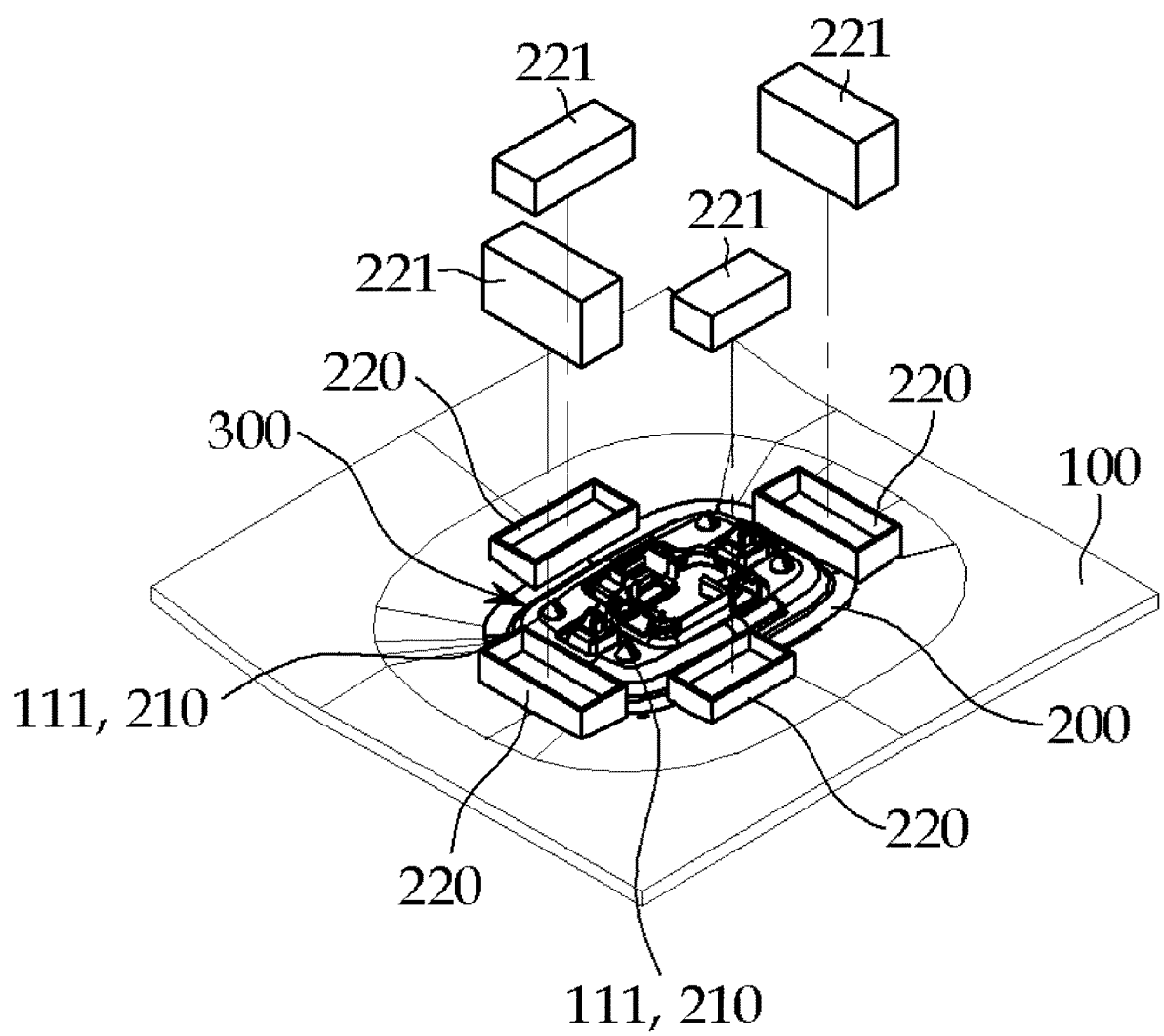
FIG. 6 is an exploded perspective view illustrating a state in which a buffer pad is forcibly assembled to the room lamp plate according to the present disclosure.
Figure 7:
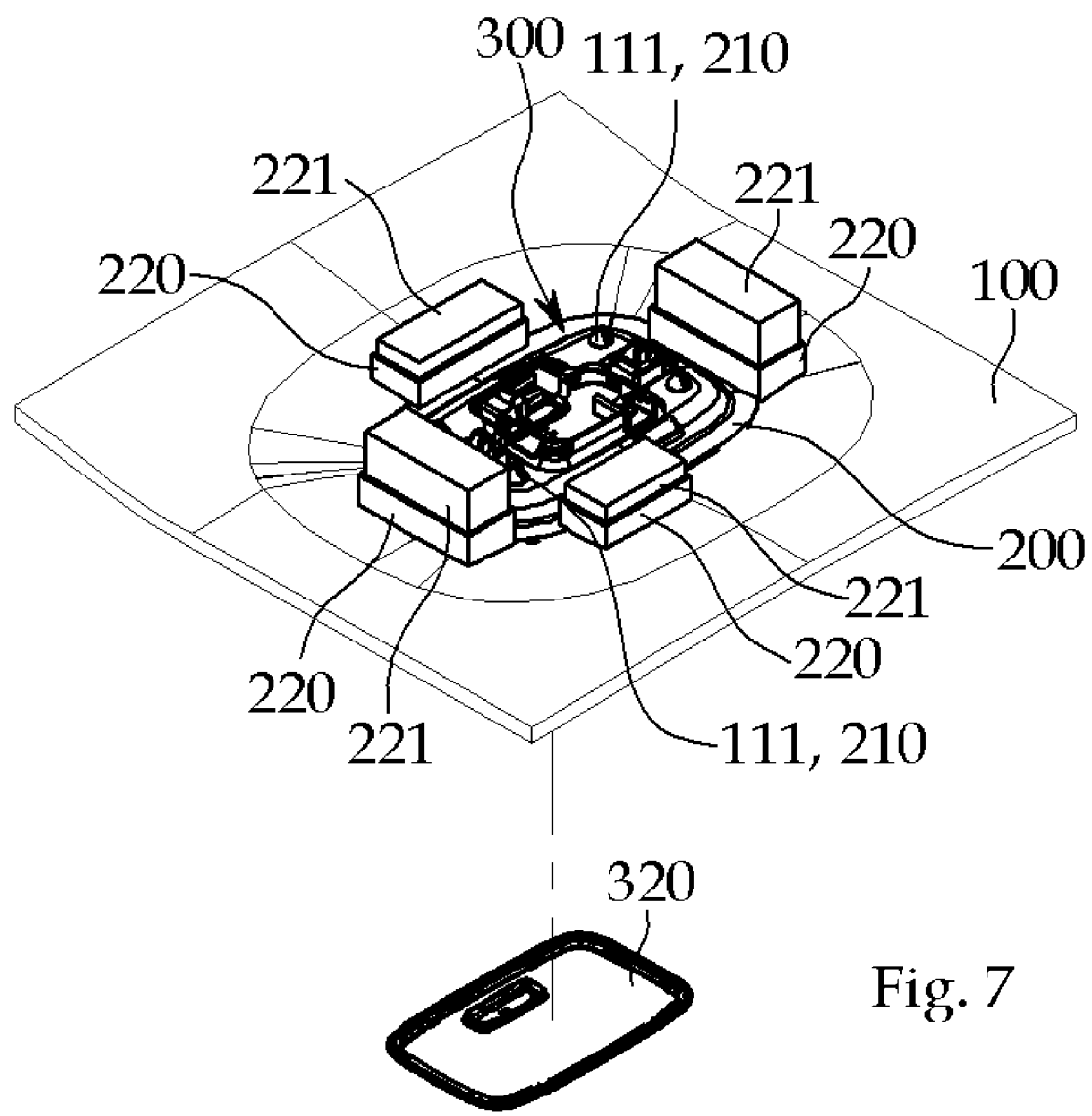
FIG. 7 is an exploded perspective view illustrating a state in which the room lamp is finished using a diffusion plate according to the present disclosure.

As illustrated in FIGS. 4 to 6, the room lamp 300 is assembled toward the opening 110 in the interior of the vehicle. In this case, the division protrusion 310 is formed in and assembled integrally with the room lamp 300.

Division Protrusion

As illustrated in FIGS. 4 and 5, the division protrusions 310 are formed at positions facing the assembly holes 210 in the room lamp 300. In this case, the division protrusion 310 is formed in a length in which the division protrusion 310 sequentially passes through the assembly hole 210 and the through-hole 111 to perform a stopping operation.

Further, as illustrated in FIGS. 4 and 5, the division protrusion 310 is fastened with the screw 311 in the interior of the vehicle, a protruding end of the division protrusion 310 is widened and stopped by an edge of the through-hole 111, and thus a stopping operation is performed.

In the drawing, reference numeral "320" is a diffusion plate that finishes the room lamp. The division protrusion 310 is fastened with the screw 311, the diffusion plate 320 is closed, and then the room lamp is finished.

A room lamp for a vehicle capable of being assembled without using an adhesive according to the present disclosure has the following effects.

(1) In a state in which a head liner and a lamp plate overlap each other, a division protrusion formed in the room plate is fitted through the head liner and the lamp plate, is fastened with a screw, and then is integrally fixed. Thus, the room lamp can be assembled without using an adhesive, and the problems caused by use of the adhesive can be solved.

(2) Further, since the division protrusion is assembled with the screw while being sequentially fitted through the head liner and the lamp plate, the division protrusion can allow the head liner and the lamp plate to be precisely assembled at a predetermined position without departing from the predetermined position.

(3) Further, since a buffer pad is forcibly fitted in and assembled with the lamp plate, even when the room lamp is replaced or repaired, the buffer pad is not extracted or separate from a mounted position, and thus work can be easily and conveniently performed.

According to the present disclosure, in a state in which the head liner and the room lamp plate overlap each other, the division protrusion formed in the room lamp passes through the head liner and the room lamp plate, the division protrusion may be fixedly fastened with the screw in a temporarily assembled state, and thus the room lamp can be assembled without using an adhesive.

What is claimed is:

1. A room lamp for a vehicle assembled without using an adhesive, wherein a room lamp plate is mounted on one surface and the room lamp for a vehicle is assembled with the room lamp plate on the other surface with respect to an opening formed in a head liner, through-holes are formed at least two positions protruding inward from edges of the opening, assembly holes are formed at positions facing the through-holes to pass through the room lamp plate, and division protrusions installed to sequentially pass through the through-holes and the assembly holes overlapping each other are formed in the room lamp, and as the division protrusions are fastened with screws at the room lamp, ends of the division protrusions are widened and thus stopped by edges of the assembly holes.

2. The room lamp of claim 1, wherein at least one seat is formed in the room lamp plate to surround the room lamp, and the seat is formed in a container shape so that a buffer pad is forcibly fitted in and assembled with the seat.

* * * * *